US009261427B2

(12) United States Patent
Kuo

(10) Patent No.: US 9,261,427 B2
(45) Date of Patent: Feb. 16, 2016

(54) FIXTURE FOR CAMERA MODULES

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 333 days.

(21) Appl. No.: 13/901,583

(22) Filed: May 24, 2013

(65) Prior Publication Data

US 2014/0137634 A1 May 22, 2014

(30) Foreign Application Priority Data

Nov. 16, 2012 (TW) .................................. 101142713

(51) Int. Cl.
*G01N 3/04* (2006.01)
*G01M 7/08* (2006.01)

(52) U.S. Cl.
CPC ........................................ *G01M 7/08* (2013.01)

(58) Field of Classification Search
CPC .................................. G01M 7/08; G01N 3/04
USPC .................... 73/856, 12.06, 12.09, 12.13, 460
See application file for complete search history.

(56) References Cited

U.S. PATENT DOCUMENTS

| 8,691,045 | B2* | 4/2014 | Zhang .................... G01N 19/04 156/299 |
| 8,944,614 | B2* | 2/2015 | Parrill .......................... 359/511 |
| 2008/0175578 | A1* | 7/2008 | Wu ........................... G03B 3/00 396/144 |
| 2009/0310959 | A1* | 12/2009 | Shih et al. ...................... 396/529 |
| 2011/0032701 | A1* | 2/2011 | Zhang ..................... F21V 5/007 362/244 |
| 2011/0114977 | A1* | 5/2011 | Miura ..................... F21S 4/008 257/91 |
| 2012/0327377 | A1* | 12/2012 | Ohsugi ................. H04N 9/3111 353/38 |
| 2013/0122247 | A1* | 5/2013 | Barnes et al. ................. 428/131 |
| 2013/0164104 | A1* | 6/2013 | Wang ............... B29D 11/00432 414/304 |
| 2013/0208472 | A1* | 8/2013 | Nishimori .......... G01N 21/8806 362/244 |

* cited by examiner

*Primary Examiner* — Laura Martin
*Assistant Examiner* — Suman K Nath
(74) *Attorney, Agent, or Firm* — Novak Druce Connolly Bove + Quigg LLP

(57) ABSTRACT

A fixture includes a base, a carrier plate, a number of pressing strips, and a cover. The base defines a base receiving chamber. The carrier plate is received in the base receiving chamber and defines a number of receiving portions in a surface opposite to the base, each receiving portion is configured for receiving a camera module, the receiving portions being arranged in a plurality of lines, the carrier plate defines a spacing portion between each two adjacent receiving portions in the same line. Each pressing strip is pressed into the spacing portions associated with one of the lines of the receiving portions to press the camera modules in the lines of the receiving portions. The cover is fixed to the base and covers the carrier plate.

16 Claims, 4 Drawing Sheets

FIXTURE FOR CAMERA MODULES

BACKGROUND

1. Technical Field

The present disclosure relates to camera modules and, particularly, to a fixture for performing a drop test on a number of camera modules simultaneously.

2. Description of Related Art

Camera modules are widely used in electronic devices such as cell phones. To ensure production quality, the camera modules need to pass a drop test before being assembled into the cell phones. Current drop tests provide for only testing one camera module at a time using a fixture, which is inefficient.

Therefore, it is desirable to provide a fixture for performing a drop test on a number of camera modules at the same time, which can overcome the above-mentioned problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. All the views are schematic.

DETAILED DESCRIPTION

Embodiments of the present disclosure will be described with reference to the drawings.

Figure 1:
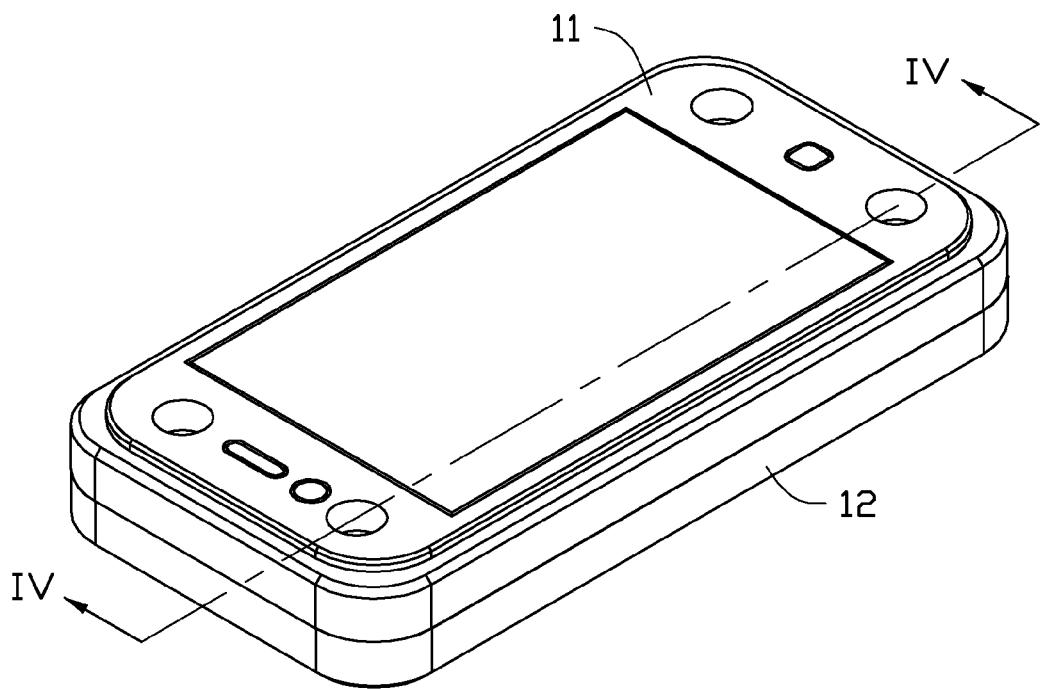
FIG. 1 is an isometric view of a fixture for performing a drop test on a number of camera modules, according to an embodiment.
Figure 2:
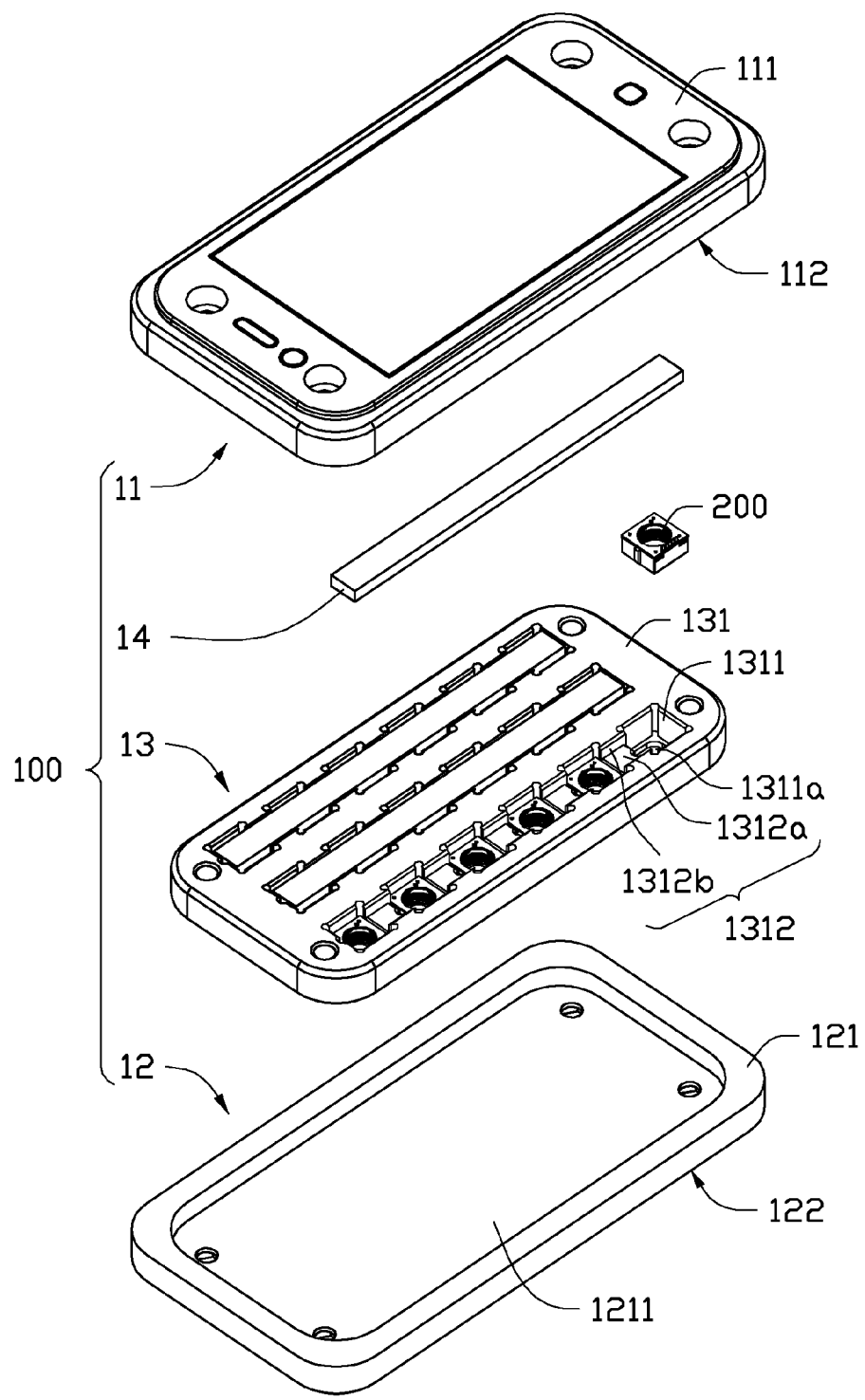
FIG. 2 is an exploded view of the fixture of FIG. 1.
Figure 3:
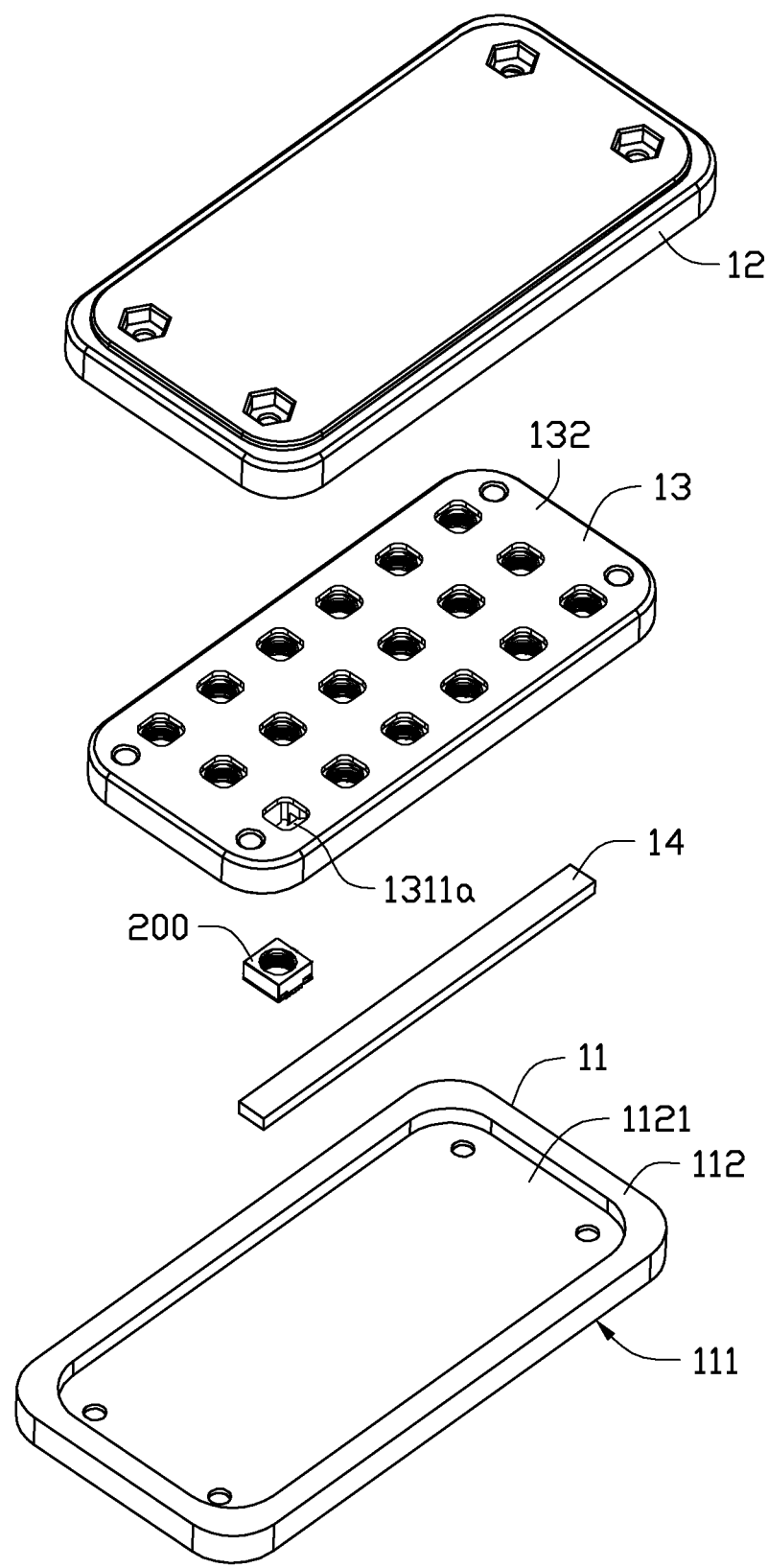
FIG. 3 is another exploded view of the fixture of FIG. 1, viewed at another angle.
Figure 4:
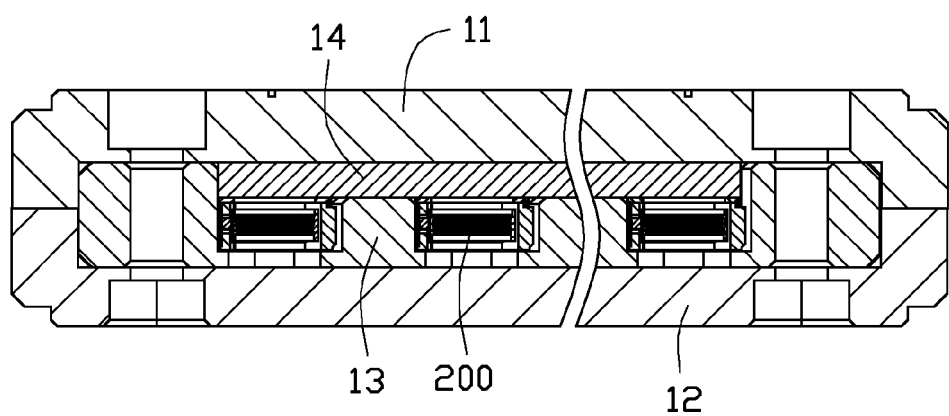
FIG. 4 is an abbreviated, cross-sectional view of the fixture of FIG. 1, taken along a line IV-IV thereof.

Referring to FIGS. 1-4, a fixture 100, according to an embodiment, is configured for performing a drop test on a number of camera modules 200 at the same time. The fixture 100 includes a cover 11, a base 12, a carrier plate 13, and a number of pressing strips 14.

The cover 11 is substantially rectangular, and includes a first surface 111 and a second surface 112 at opposite sides thereof. The cover 11 defines a first receiving chamber 1121 in the second surface 112. The first receiving chamber 1121 is substantially rectangular.

The base 12 is substantially rectangular, and includes a third surface 121 and a fourth surface 122 at opposite sides thereof. The base 12 defines a second receiving chamber 1211 in the third surface 121. The second receiving chamber 1211 is substantially rectangular.

The carrier plate 13 is substantially rectangular, and includes a fifth surface 131 and a sixth surface 132 at opposite sides thereof. The fifth surface 131 and the sixth surface 132 are substantially identical to openings of the second receiving chamber 1211 and the first receiving chamber 1121 in shape and size. A thickness of the carrier plate 13 is substantially the same as the depths of the first receiving chamber 1121 and the second receiving chamber 1211 combined.

The carrier plate 13 defines a number of receiving portions 1311 in the fifth surface 131. Each receiving portion 1311 is configured for receiving one of the camera modules 200. The receiving portions 1311 are arranged in a number of lines, with each line running along a length direction of the carrier plate 13. The number of lines of the receiving portions 1311 is three in this embodiment, but can be changed depending on need in other embodiments. The camera modules 200 are rectangular. Correspondingly, the receiving portions 1311 are in the shape of rectangular cutouts. A depth of each receiving portion 1311 is greater than a height of each camera module 200.

The carrier plate 13 defines a through hole 1311a in a bottom of each receiving portion 1311, to simulate structural conditions of the camera module 200 when being assembled in a cell phone (not shown) and thereby improve the accuracy of the drop test.

The carrier plate 13 forms a plurality of spacing portions 1312 in the fifth surface 131. Each spacing portion 1312 is located between two corresponding adjacent receiving portions 1311 in a given same line of the receiving portions 1311. Each spacing portion 1312 is in the shape of a rectangular cutout communicating with the two adjacent receiving portions 1311. Each spacing portion 1312 has a bottom surface 1312a; and two opposite sidewalls 1312b each substantially parallel with a length direction of the line of receiving portions 1311. The bottom surface 1312a is substantially coplanar with a top of each corresponding camera module 200 when the camera modules 200 are received in the adjacent receiving portions 1311.

A length of each pressing strip 14 is substantially identical to a length of each line of receiving portions 131. A width of each pressing strip 14 is substantially identical to or slightly greater than a distance between the sidewalls 1312b of each spacing portion 1312 (i.e. a width of each spacing portion 1312). A thickness of each pressing strip 14 is substantially equal to a depth of each spacing portion 1312. Thereby, the pressing strip 14 accomplishes a friction fit in a corresponding line of spacing portions 1312.

In assembly, the carrier plate 13 is placed into the first receiving chamber 1121 such that the fifth surface 151 faces up. Each camera module 200 is received in one of the receiving portions 1311. Each pressing strip 14 is pressed into a corresponding line of spacing portions 1312 and held in place by friction to press against and hold the line of camera modules 200 in their corresponding receiving portions 1311. The cover 11 is fixed to the base 12 by screws such that the second surface 112 contacts the third surface 121 and an upper portion of the carrier plate 13 is received in the second receiving chamber 1211.

As such, the fixture 10 can be used to perform the drop test on more than one camera module 200 at any one time, increasing the efficiency.

It will be understood that the above particular embodiments are shown and described by way of illustration only. The principles and the features of the present disclosure may be employed in various and numerous embodiments thereof without departing from the scope of the disclosure. The above-described embodiments illustrate the possible scope of the disclosure but do not restrict the scope of the disclosure.

What is claimed is:

1. A fixture for holding camera modules, comprising:
   a cover comprising a first surface and a second surface at opposite sides thereof, the cover defining a first receiving chamber in the second surface;
   a base comprising a third surface and a fourth surface at opposite sides thereof, the base defining a second receiving chamber in the third surface;
   a carrier plate received in the first and second receiving chambers, the carrier plate comprising a fifth surface and a sixth surface at opposite sides thereof, the carrier plate defining:

a plurality of receiving portions in the fifth surface, each receiving portion being configured for receiving a camera module, the receiving portions being arranged in a plurality of lines; and a plurality of spacing portions, each spacing portion located between two corresponding adjacent receiving portions in a given same line of the receiving portions, each spacing portion communicating with the two adjacent receiving portions; and a plurality of pressing strips, each of which is pressable into a corresponding line of the spacing portions such that the pressing strip presses against one or more camera modules received in the corresponding line of the receiving portions.

2. The fixture of claim 1, wherein the fifth surface and the sixth surface are substantially identical to openings of the second receiving chamber and the first receiving chamber in shape and size.

3. The fixture of claim 1, wherein a thickness of the carrier plate is the same as the depths of the first receiving chamber and the second receiving chamber combined.

4. The fixture of claim 1, wherein a depth of each receiving portion is greater than a height of each camera module, each spacing portion comprises a bottom surface and two opposite sidewalls substantially parallel with a length direction of the line of the receiving portions, the bottom surface is substantially coplanar with a top of each corresponding camera module when the camera modules are received in the adjacent receiving portions.

5. The fixture of claim 1, wherein the carrier plate defines a through hole in a bottom of each receiving portion.

6. The fixture of claim 1, wherein a length of each pressing strip is substantially identical to a length of each line of the receiving portions.

7. The fixture of claim 1, wherein a width of each pressing strip is substantially identical with or slightly greater than a width of each spacing portion.

8. The fixture of claim 1, wherein a thickness of each pressing strip is substantially equal to a depth of each spacing portion.

9. A fixture for holding camera modules, comprising:
a base defining a base receiving chamber;
a carrier plate received in the base receiving chamber and defining:
a plurality of receiving portions in a surface thereof opposite to the base, each receiving portion being configured for receiving a camera module, the receiving portions being arranged in a plurality of lines; and
a plurality of spacing portions, each spacing portion located between two corresponding adjacent receiving portions in a given same line of the receiving portions;
a plurality of pressing strips, each of which is pressable into one or more of the spacing portions associated with one of the lines of the receiving portions such that the pressing strip presses against one or more camera modules received in the line of the receiving portions; and
a cover fixed to the base and covering the carrier plate.

10. The fixture of claim 1, wherein each pressing strip is a full entity.

11. The fixture of claim 9, wherein a depth of each receiving portion is greater than a height of each camera module, each spacing portion comprises a bottom surface and two opposite sidewalls substantially parallel with a length direction of the line of the receiving portions, the bottom surface is substantially coplanar with a top of each corresponding camera module when the camera modules are received in the adjacent receiving portions.

12. The fixture of claim 9, wherein the carrier plate defines a through hole in a bottom of each receiving portion.

13. The fixture of claim 9, wherein a length of each pressing strip is substantially identical to a length of each line of the receiving portions.

14. The fixture of claim 9, wherein a width of each pressing strip is substantially identical with or slightly greater than a width of each spacing portion.

15. The fixture of claim 9, wherein a thickness of each pressing strip is substantially equal to a depth of each spacing portion.

16. The fixture of claim 9, wherein each pressing strip is a full entity.

* * * * *